Feb. 25, 1930.    P. N. BOSSART    1,748,751
RAILWAY TRAFFIC CONTROLLING APPARATUS
Filed Nov. 22, 1927

INVENTOR:
P. N. Bossart,
by A. L. Vencill
His Attorney

Patented Feb. 25, 1930

1,748,751

UNITED STATES PATENT OFFICE

PAUL N. BOSSART, OF SWISSVALE, PENNSYLVANIA, ASSIGNOR TO THE UNION SWITCH & SIGNAL COMPANY, OF SWISSVALE, PENNSYLVANIA, A CORPORATION OF PENNSYLVANIA

RAILWAY-TRAFFIC-CONTROLLING APPARATUS

Application filed November 22, 1927.. Serial No. 234,964.

My invention relates to railway traffic controlling apparatus, and particularly to automatic train controlling apparatus of the intermittent inductive type.

I will describe two forms of apparatus embodying my invention, and will then point out the novel features thereof in claims.

Figure 1:
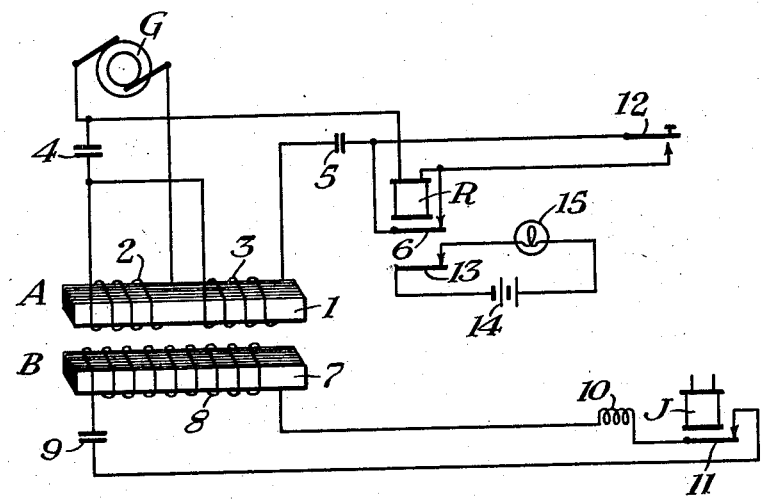
Figure 2:
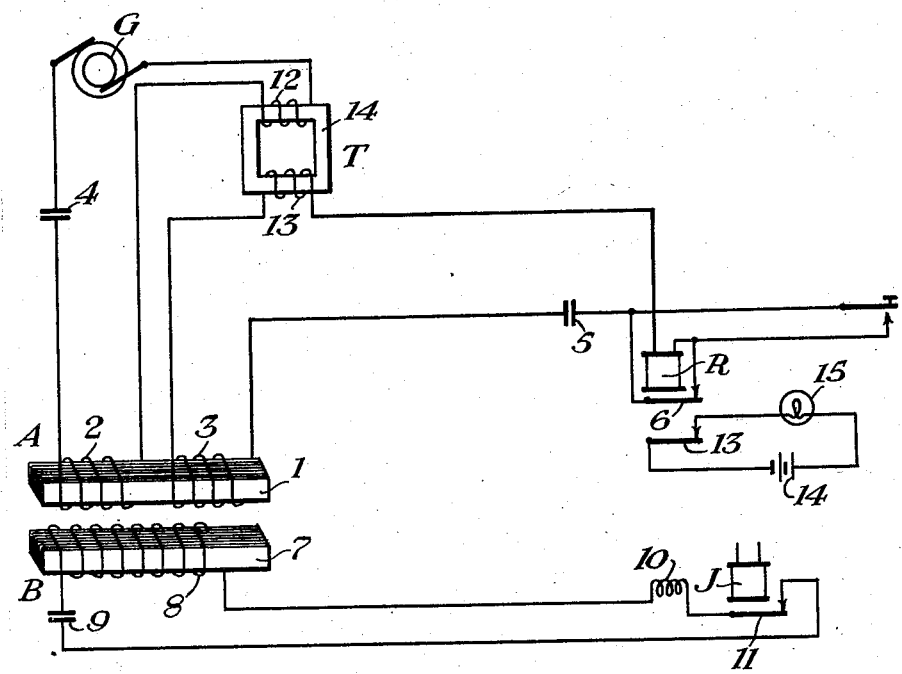

In the accompanying drawing, Fig. 1 is a diagrammatic view showing one form of apparatus embodying my invention. Fig. 2 is a diagrammatic view showing a modified form of the apparatus illustrated in Fig. 1, and also embodying my invention.

Similar reference characters refer to similar parts in both views.

Referring first to Fig. 1, the reference character A designates a train carried receiver comprising a magnetizable core 1 provided with a primary 2 and a secondary 3. The primary 2 is constantly supplied with alternating current from a generator G, the circuit for this winding preferably including a condenser 4 by means of which the circuit is tuned to resonance at the frequency of the current supplied by the generator G. The train is also provided with a relay R having a circuit which includes secondary 3, the condenser 4, and a front contact 6 of the relay R. This circuit preferably includes a condenser 5 by means of which the relay circuit is tuned to resonance at the frequency of the current delivered by the generator G. It will be observed that the flux created in core 1 by the current in primary 2 induces a voltage in secondary 3. The circuit including secondary 3 is capacitively coupled with a circuit for the primary 2 so that the electromotive force across the terminals of condenser 4 is also supplied to the circuit including the winding of relay R. The parts are so connected that the electromotive force supplied by condenser 4 is opposed to the electromotive force induced in secondary 3 and under normal conditions the electromotive force of condenser 4 predominates so that the resultant current normally flowing in the winding of relay R is sufficient to energize the relay. The relay R may be utilized in any suitable manner to control train governing means; as here shown a front contact 13 of this relay is included in circuit with a battery 14 and a lamp 15 so that the lamp will be lighted when the relay is energized.

Located in the trackway is a controlling element B comprising a magnetizable member 7 provided with a winding 8. The winding 8 is provided with a circuit including a reactor 10 and a condenser 9 and controlled by the front contact 11 of a relay J. The relay J may in turn be controlled in any suitable manner and when this relay is energized the circuit is closed for winding 8 of element B, the parts being so arranged that the reactances of 9 and 10 are substantially equal and opposite at the frequency of the current supplied by generator G.

In explaining the operation of the apparatus, I will first assume that when the train passes over the trackway element B the contact 11 is open, so that the circuit for winding 8 is open. Under these conditions, the reluctance of the magnetic circuit traversed by the flux created by the current in the primary 2 of receiver A is considerably decreased so that the electromotive force induced in secondary 3 is increased, and becomes more nearly equal to the electromotive force across the condenser 4. As a result the effective electromotive force applied to the terminals of relay R is decreased and the relay becomes de-energized to display a stop indication on the train. Inasmuch as the circuit for relay D includes a front contact 6 of this relay, the relay when once open, will remain open until the path through the front contact 6 is shunted. This shunting may be accomplished for example by a push button 12 connected in multiple with contact 6.

If contact 11 of relay J is closed when the train passes over the element B, the effect of this element on the train carried apparatus is neutralized to such an extent that the relay R remains closed, that is to say, when the circuit for winding 8 is closed, this winding nullifies the effect of the member 7 on the receiver A.

Referring now to Fig. 2, the reference character T designates a transformer having a primary 12 and a secondary 13 which are preferably wound on a magnetizable core 14. The primary 12 is connected in series with the receiver primary 2 and generator G, in a circuit which is tuned to resonance by condenser 4. The relay R is connected over its own front contact 6, with secondary 3 of receiver A and secondary 13 of transformer T in series opposition, this circuit being tuned by condenser 5. The relay R controls a lamp 15 in the same manner as in Fig. 1. With the arrangement here shown the parts are so proportioned that the electromotive force supplied by secondary 13 of transformer T normally predominates over the electromotive force induced in secondary 3 of receiver A. Relay R is therefore normally energized. When the train passes an element B having its winding 8 open-circuited, the electromotive force induced in secondary 3 is increased, thereby decreasing the current supplied to relay R and causing the relay to become de-energized. When front contact 11 of relay J is closed to complete the circuit for winding 8, the element B has no effect upon the train carried receiver.

Although I have herein shown and described only two forms of railway traffic controlling apparatus embodying my invention, it is understood that various changes and modifications may be made therein within the scope of the appended claims without departing from the spirit and scope of my invention.

Having thus described my invention, what I claim is:

1. In combination with a train carried receiver comprising a primary and a secondary located in inductive relation; a first circuit including a source of alternating current, said primary and a condenser, a relay; a second circuit including said condenser, said relay, and said secondary in such manner that the electromotive force across the condenser opposes the electromotive force of said secondary means for tuning said second circuit to resonance at the frequency of the current from said source, and a trackway member co-operating with said receiver at times to vary the electromotive force induced in the secondary.

2. In combination with a train carried receiver comprising a primary and a secondary located in inductive relation, a circuit for said primary including a source of alternating current, a relay connected with said secondary, means separate and distinct from the core of said receiver for coupling said relay circuit with said primary circuit to apply an electromotive force to the relay in opposition to and normally predominating over the electromotive force applied thereto by said secondary, and a trackway device co-operating with said receiver to reduce the reluctance thereof and to thereby increase the electromotive force induced in said secondary to such value as to cause said relay to become de-energized.

In testimony whereof I affix my signature.

PAUL N. BOSSART.